(12) United States Patent
Williams, Jr.

(10) Patent No.: US 8,586,180 B2
(45) Date of Patent: Nov. 19, 2013

(54) MULTILAMINAR TAG MATERIAL

(71) Applicant: Robert E. Williams, Jr., Collinsville, IL (US)

(72) Inventor: Robert E. Williams, Jr., Collinsville, IL (US)

(73) Assignee: Sev-Rend Corporation, Collinsville, IL (US)

( * ) Notice: Subject to any disclaimer, the term of this patent is extended or adjusted under 35 U.S.C. 154(b) by 0 days.

(21) Appl. No.: 13/694,188

(22) Filed: Nov. 5, 2012

(65) Prior Publication Data

US 2013/0071648 A1    Mar. 21, 2013

Related U.S. Application Data

(63) Continuation of application No. 12/928,352, filed on Dec. 9, 2010, now abandoned, which is a continuation-in-part of application No. 12/924,735, filed on Oct. 4, 2010.

(60) Provisional application No. 61/278,379, filed on Oct. 6, 2009.

(51) Int. Cl.
*B32B 5/16* (2006.01)
*B32B 27/00* (2006.01)

(52) U.S. Cl.
USPC .......................................... 428/323; 428/500

(58) Field of Classification Search
None
See application file for complete search history.

*Primary Examiner* — Sheeba Ahmed
(74) *Attorney, Agent, or Firm* — Paul M. Denk

(57) ABSTRACT

A three layer tag material constructed of a top layer of polymer bonded to the emulsion side of a micro-encapsulated carbonless paper which in turn is bonded to the uncoated side of a coated one side paper to form a composite construction the individual layers of which are not thereafter generally separable from one another. The resulting composite construction is a laminated two-sided printable tag material with both sides being printable by traditional printing methods, or which can be subjected to either metal stamping or embossing applied to either surface of the tag to furnish print material upon said tag. The total tag caliper is reliant on the sum of the calipers of the three different layers that can be customized for specific applications by varying the calipers of one or more of the different components. An additional layer of clear laminate may be adhered to the coated side of the coated one side paper, on the bottom, for additional print protection.

5 Claims, 1 Drawing Sheet

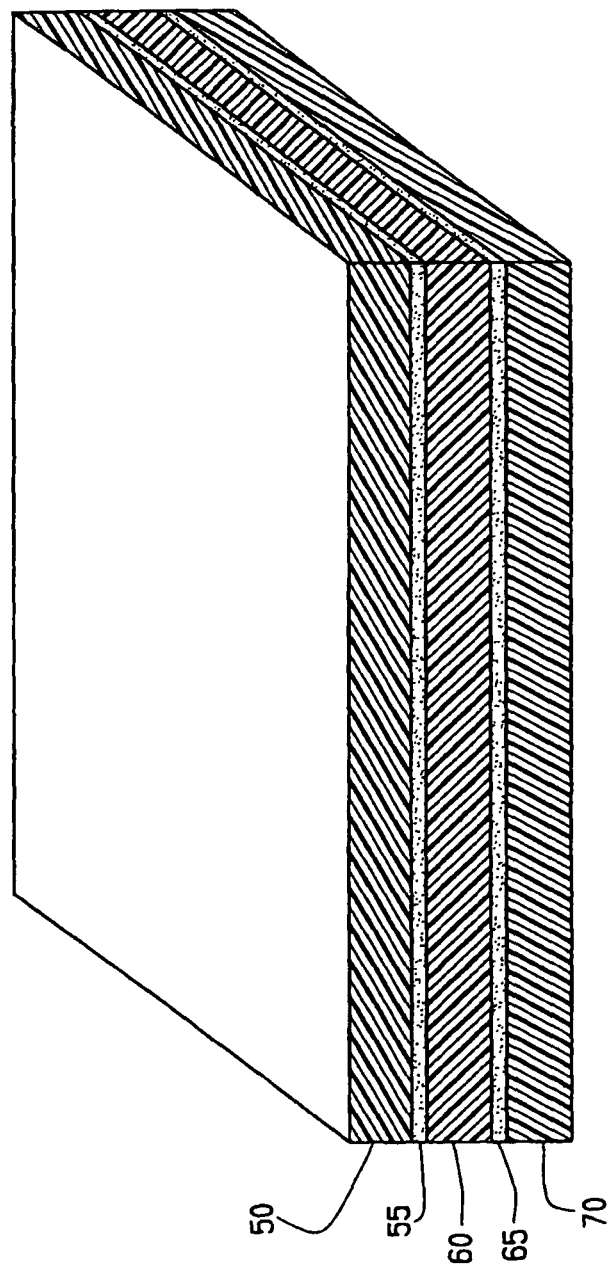

MULTILAMINAR TAG MATERIAL

CROSS REFERENCE TO RELATED APPLICATION

This continuation patent application claims priority to the continuation-in-part patent application having Ser. No. 12/928,352, filed on Dec. 9, 2010, now Publication No. US2011/0081552A1, which claims priority to the non-provisional patent application having Ser. No. 12/924,735, filed on Oct. 4, 2010, now Publication No. U.S. 2011/0086188A1, which claims priority to the provisional patent application having Ser. No. 61/278,379, filed on Oct. 6, 2009.

FIELD OF THE INVENTION

The tag material of this invention relates to the use of laminate components, which when adhesively adhered together form a tag type of material that can be imprinted with various indicia and product information or even subjected to metal stamping or embossing upon its surface to furnish an acceptable tag for use in the marketing of products to the trade.

BACKGROUND OF THE INVENTION

This present invention provides a laminate tag material for use for any number of tag manufactured applications. The tag material is reinforced and printable or embossable on two sides, with one side being printable by any of a variety of printing methods.

This invention relates generally to tag materials which are printable by a variety of printing methods including flexo, off-set, rotogravure, screen printing, etc., with the micro-encapsulated layer being impact printable for date coding, lot coding, or any other application where a durable, visible image is required when being embossed or metal stamped without the use of inks or dyes.

Many style of tag material have been readily available in the art and for use for providing information relative to various marketed products. For example, paper tags have long been used in the art. Polymer type tags have become more prominent, because of their durability, and now have been designed for accepting print material. A combination of these types of components formulated into tags has not apparently been available to any improved extent. Hence, the provision of tags that readily accept print indicia, or other information, or which may be embossed, and yet remain very durable during usage, and can withstand rough handling, is a welcome addition to the art.

SUMMARY OF THE INVENTION

The tag material of this current invention is designed for usage for any number of tag applications. It is a multilaminar style of tag that can accept various indicia, whether it is imprinted thereon or embossed or metal stamped with or without the use of any inks or dyes. In its laminar structure, the top layer of the tag will be formed of a clear laminate which in turn is laminated or bonded with an adhesive to the emulsion side of a micro-encapsulated paper which comprises the second or inner layer. This second layer may comprise a form of NCR paper, which is a carbonless paper, such as available from Appleton Paper Company, of Appleton, Wis. Its brand name is NCR. This second or inner layer is then laminated or bonded with an adhesive to the uncoated side of a third or bottom layer of paper, which is formed as a coated one side (C1S) paper. The laminated, micro-encapsulated surface of the tag creates the unique feature of a resulting tag material that is capable of being printed without the use of any inks or dyes, by either a metal stamping or embossing of the surface of the tag material. This may be done to either of its exposed surfaces. Although, it is likely that the various printing methods may also apply by print indicia onto the label, to provide it with the type of information needed upon a product label, when employed.

The tag material consists of three layers bonded by an adhesive. The first or top layer of the tag material is formed as the clear laminate as explained herein. This layer is laminated or bonded by adhesive to the top face of the second, or middle layer, which comprises a micro-encapsulated paper, of the carbonless type, as previously explained. This second or inner layer is then laminated or bonded with an adhesive to the uncoated side of the third or bottom layer of paper, comprising the C1S paper as defined. This third or bottom layer may be formed of the type of paper as explained, or as an alternative, a related sheet material, which has been coated with a direct thermal emulsion, with the thermal emulsion facing outwardly in the laminate may be used. This third layer is laminated or bonded by an adhesive to the bottom face of the said second layer. The type of adhesive that may be used may be any of the variety of adhesives normally used for laminating papers or films together, and one such laminated adhesive is available under the brand name Airflex 426, which is a water based laminating adhesive, manufactured by Air Products Company. There are a variety of adhesives suppliers with various adhesive formulas that could be used for this type of lamination.

It is, therefore, the principal object of this invention to provide a laminated material for use for tag purposes, and which may combine a polymer layer, applied to a carbonless paper, and having a coated one side bottom layer, which when all laminated together, can be either imprinted with data, or embossed or metal stamped with or without the use of inks or dyes.

Another object of this invention is to provide a durable tag material that incorporates both paper and polymer film, the latter adding to the durability of the tag during its application and usage.

Still another object of this invention is to provide an easily formed laminate which may be embossed or stamped with indicia, due to the formation of its intermediate layer with carbonless paper, which can be stamped or embossed to provide readily available and readable indicia for the tag in preparation for its usage.

These and other objects may become more apparent to those skilled in the art upon review of the summary of the invention as provided herein, and upon undertaking a study of the description of its preferred embodiments, in view of the drawing.

BRIEF DESCRIPTION OF THE DRAWINGS

In referring to the drawings:

FIG. 1 is a perspective view of the laminated tag material of this invention, showing its three layers as bonded together, preferably with adhesive, to furnish a carbonless paper type of polymer reinforced tag for use for identification purposes when the tag is applied to a product during usage.

DESCRIPTION OF THE PREFERRED EMBODIMENT

In referring to the drawings, and in particular FIG. 1, the three layer tag of this invention is formed of material generally constructed of a top layer 50, formed of a clear polypropylene or related laminate material bonded to the emulsion side of a micro-encapsulated carbonless paper layer 60, being bonded by an adhesive 55, which paper layer 60 in turn is bonded to the uncoated side of a coated one side (C1S) paper 70. This bonding also is attained by means of adhesive 65. In referring to the drawing, the resulting construction is a laminated, two side printable tag material with both sides being printable by traditional printing methods, such as flexo, rotogravure, and the like. Additionally, a laminated micro-encapsulated side of the tag is capable of being imaged without the use of inks or dyes, by either metal stamping or embossing of the surface of the tag. This is primarily due to the presence of the carbonless paper being available for the intermediate laminate provided within the tag material. The total tag caliper is reliant on the sum of the caliper of the three different layers that can be customized for specific applications by varying the calipers of one or more of the different components. In addition, the layer of clear laminate, as at 50, may also be adhered to the coated side of the C1S paper for additional print protection.

This tag material of the current invention is designed for usage for a number of tag applications, the top layer of the tag will be formed of a clear laminate which in turn is laminated or bonded with adhesive to the emulsion side of the micro-encapsulated paper, which comprises the second or inner layer of the tag material. This is the carbonless paper of the intermediate laminate. This second or inner layer is then laminated or bonded with adhesive to the uncoated side of the third or bottom layer, which is formed, as aforesaid, to the coated one side (C1S) paper. The laminated, micro-encapsulated surface of the tag creates the unique feature of the resulting tag material that is capable of being printed without the use of inks or dyes by either the metal stamping or embossing of the surface of the tag material, during its preparation.

Obviously, other types of polymer films may be used in combination with this laminated tag, whether it is applied to the upper or lower surface of the NCR paper, in its formulation.

Variations or modifications to the subject matter of this invention may occur to those skilled in the art upon reviewing the disclosure as provided herein. Such variations, if within the spirit of this development, are intended to be encompassed within the scope of any claims to patent protection provided herein. The description of the preferred embodiment as set forth herein, and as depicted in the drawings, is done so for illustrative purposes only.

I claim:

1. A material usable as a product tag for displaying tag information on one or both outer sides of such product tag, comprising:

a three layer tag assembly having outer top and bottom sides at which tag information may be displayed when the tag assembly is applied as a tag to a product, said three layer tag assembly including;

a first, top layer of polymer film, said top layer being a clear laminate having upper and lower sides, said upper side forming said top side of said three layer tag assembly;

a second, middle layer of a micro-encapsulated carbonless paper having upper and lower surfaces and including imaging matter within rupturable microcapsules, said upper surface of said middle layer bonded to said lower surface of said top layer by a bonding adhesive;

a third, bottom layer of coated one side (C1S) paper having an uncoated side and a coated side, said uncoated side bonded to said lower surface of said middle layer by a bonding adhesive, said coated side forming said bottom side of said three layer tag assembly;

said top, middle, and bottom layers bonded securely to one another to form a composite element having the form of a sheet the individual layers of which are not-thereafter separable from one another during usage, whereby neither of said top and bottom layers are generally individually removable from said composite element forming said sheet;

said top and bottom sides of said material each being capable of accepting and displaying printing applied thereto; and said three layer tag assembly also being responsive to the application of embossing or metal stamping applied to an outer side of said tag assembly to effect the rupture of certain of said microcapsules of said carbonless paper and a resulting display at an outer side on said tag assembly of indicia corresponding to such embossing or metal stamping.

2. The material of claim 1 wherein the rupture of said certain microcapsules of said carbonless paper results in the display of a corresponding image through said clear laminate of said top layer.

3. The material of claim 1 wherein said top layer is a clear laminate of polypropylene.

4. The material of claim 1 wherein the application of such embossing or metal stamping effects the transfer of imaging matter from said carbonless paper of said middle layer to said uncoated side of said bottom layer and the display thereof through the coated side of said bottom layer.

5. The material of claim 1 wherein an additional clear laminate may be adhered to the coated side of said lower layer to provide additional protection for any printing applied thereto and indicia displayed thereat.

* * * * *